Nov. 14, 1933.  O. J. SUNDSTRAND  1,934,747
ADDING AND SUBTRACTING MACHINE
Filed Jan. 23, 1929    7 Sheets-Sheet 1
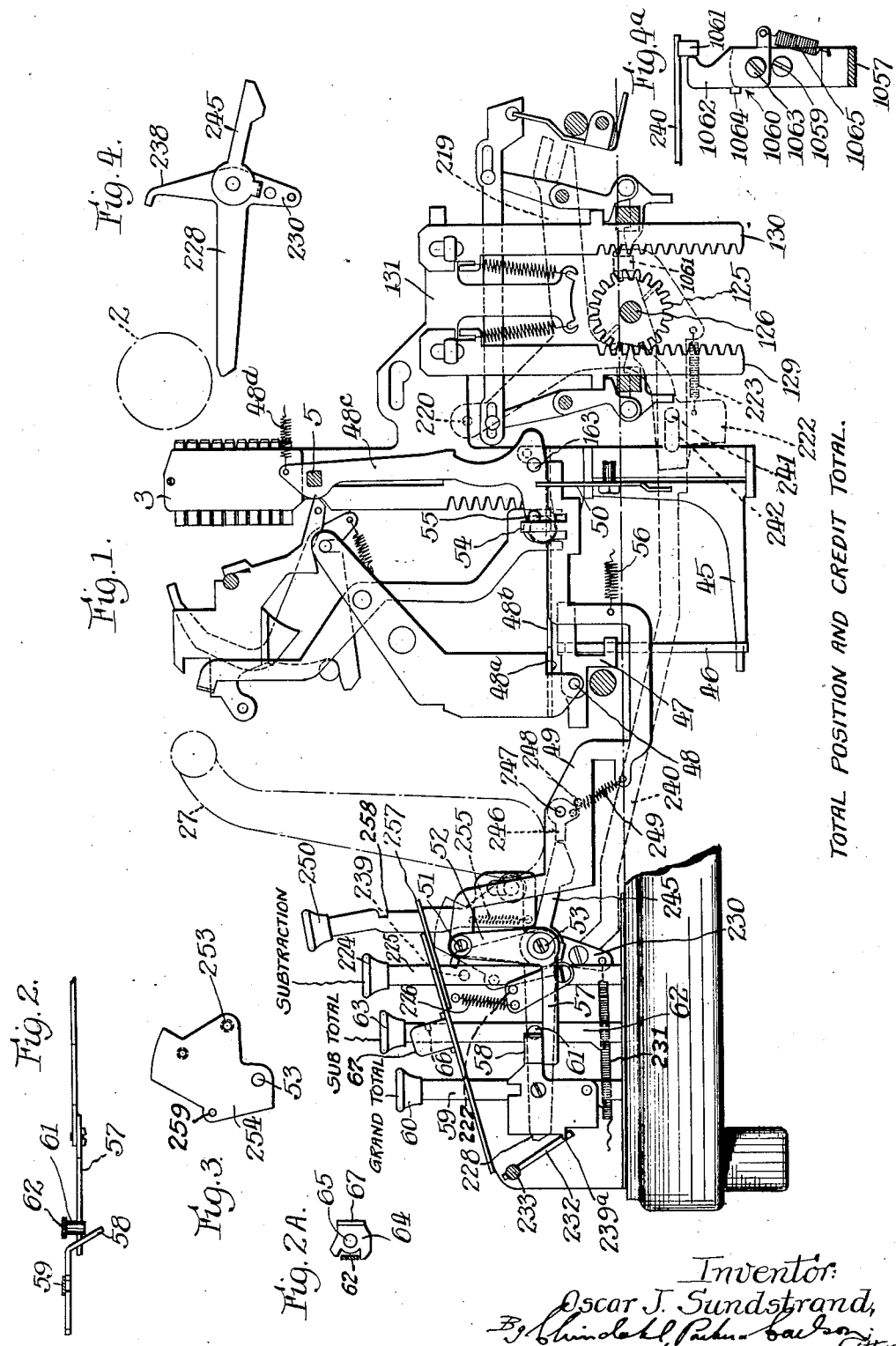
Inventor:
Oscar J. Sundstrand,
By Chindahl, Parker, Carlson
Attys.

Nov. 14, 1933.   O. J. SUNDSTRAND   1,934,747
ADDING AND SUBTRACTING MACHINE
Filed Jan. 23, 1929   7 Sheets-Sheet 2

Inventor:
Oscar J. Sundstrand,
By Lindahl, Parker, Carlson
Attys.

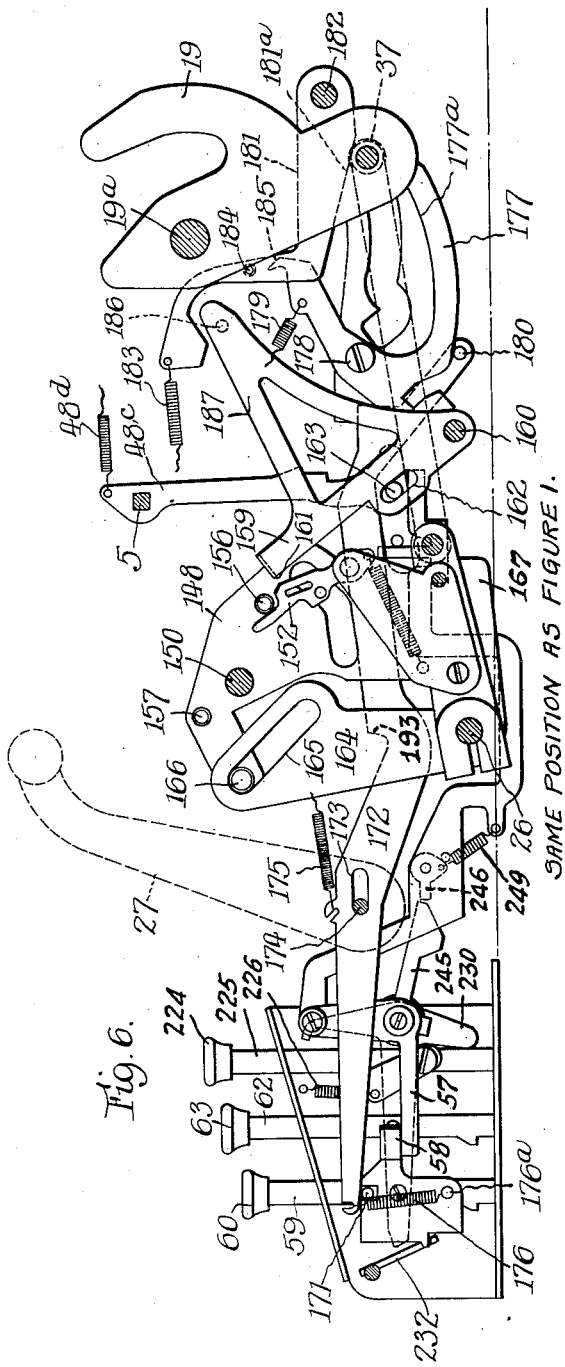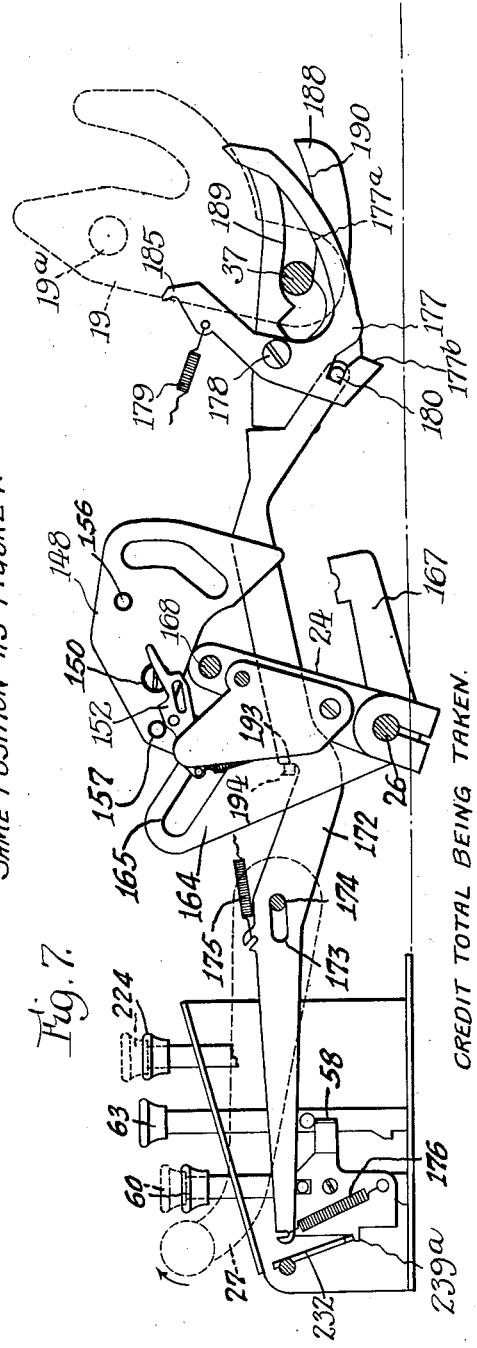

Nov. 14, 1933.    O. J. SUNDSTRAND    1,934,747
ADDING AND SUBTRACTING MACHINE
Filed Jan. 23, 1929    7 Sheets-Sheet 4
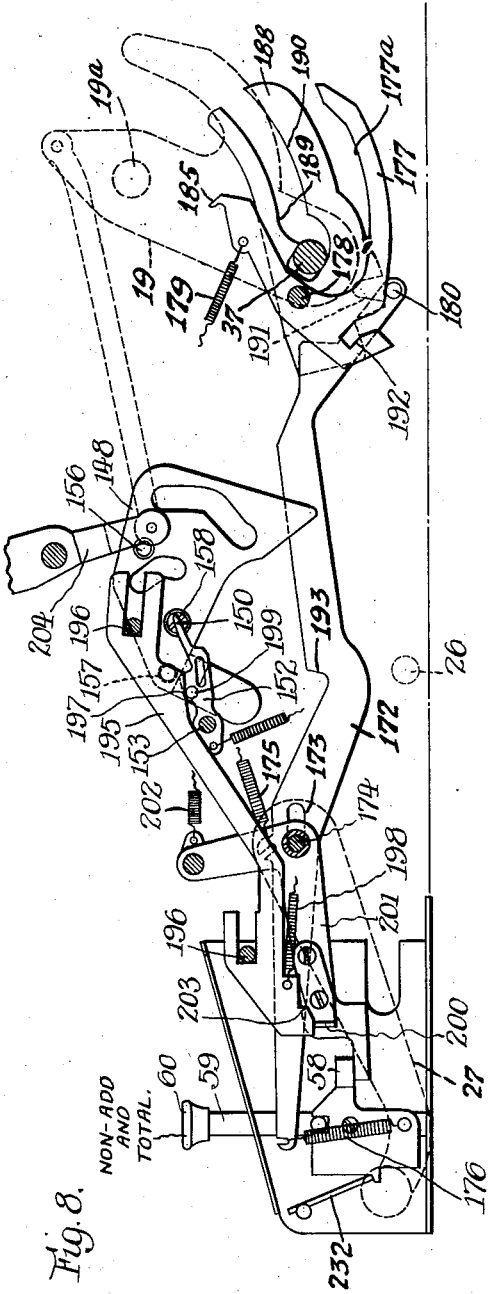
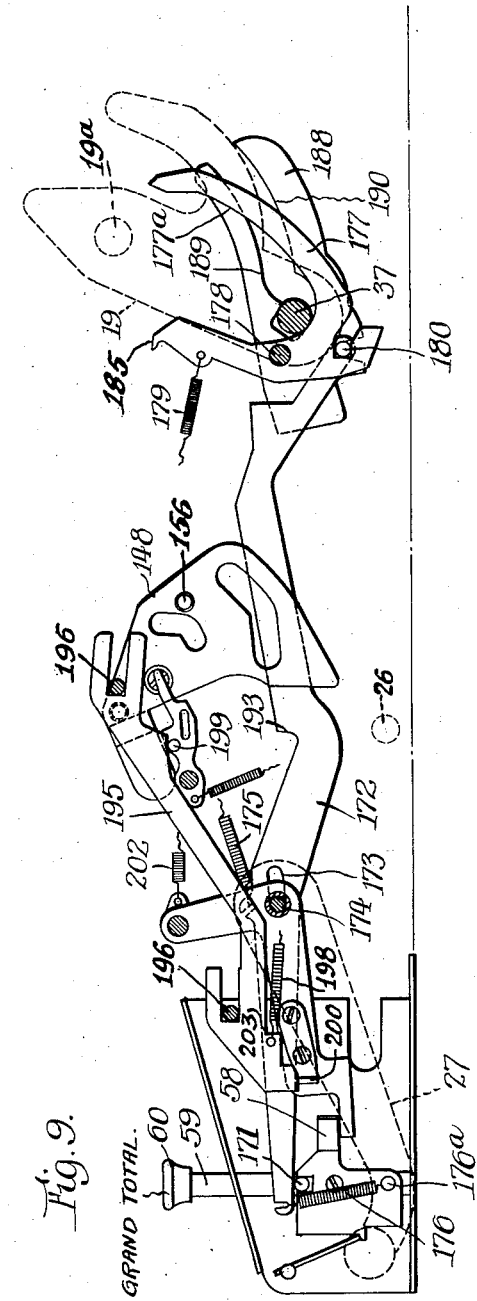
Inventor:
Oscar J. Sundstrand,
By Chindahl, Packer & Carlson
Attys.

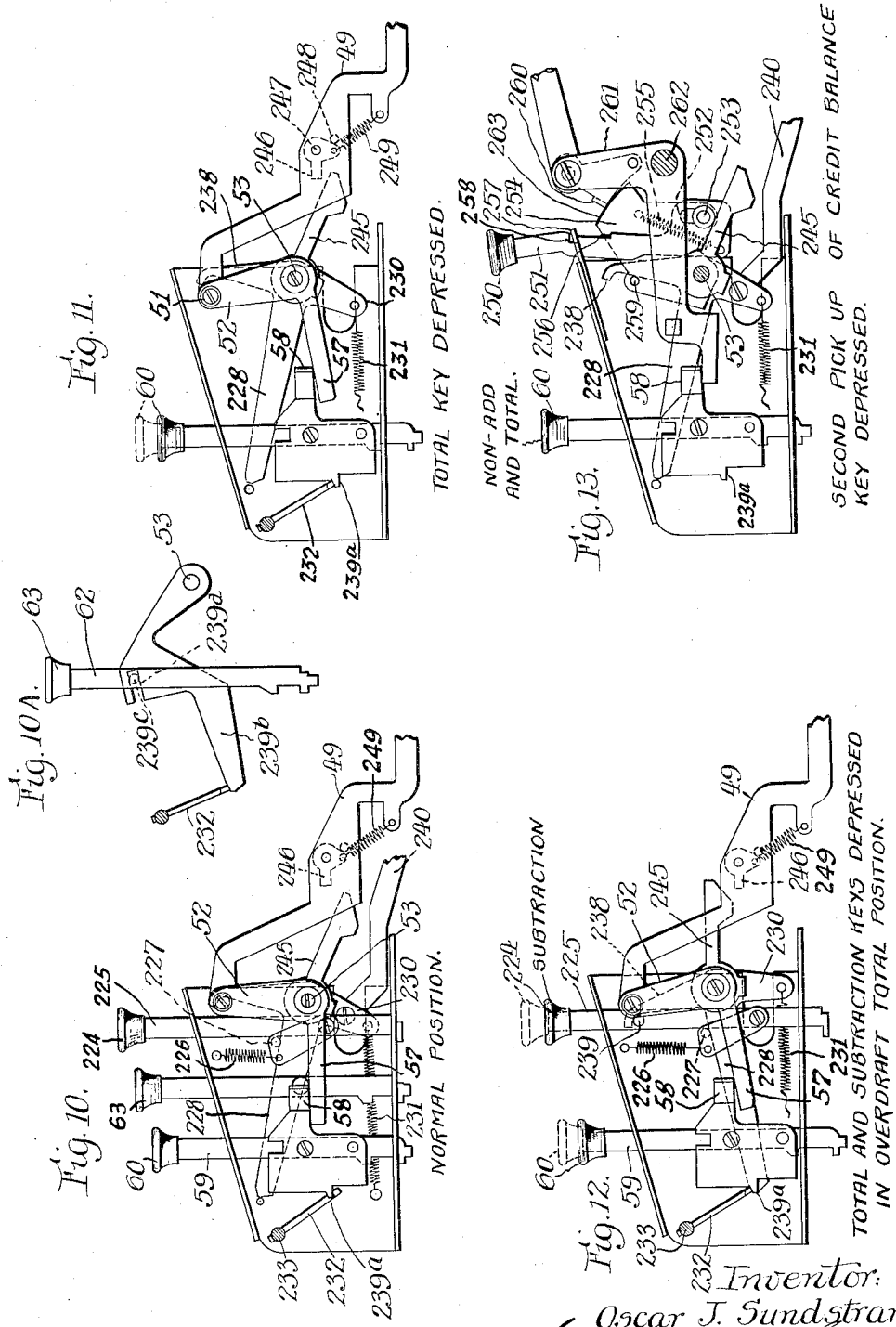

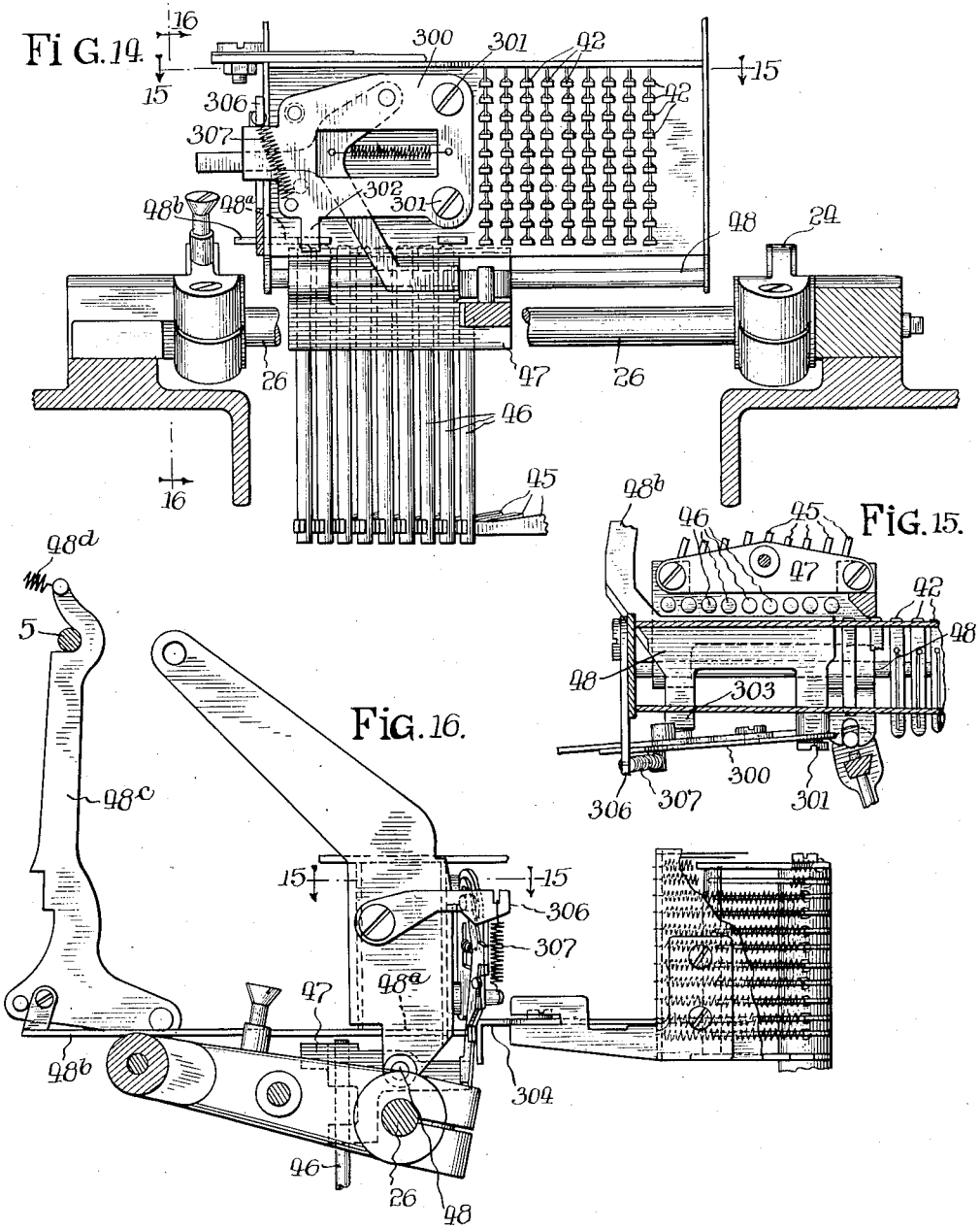

Nov. 14, 1933.  O. J. SUNDSTRAND  1,934,747
ADDING AND SUBTRACTING MACHINE
Filed Jan. 23, 1929   7 Sheets-Sheet 7

Inventor
Oscar J. Sundstrand,
By Chindell Parker Carlson
Attorneys

Patented Nov. 14, 1933

1,934,747

UNITED STATES PATENT OFFICE 1,934,747

ADDING AND SUBTRACTING MACHINE

Oscar J. Sundstrand, Rockford, Ill., assignor to Sundstrand Corporation, Wilmington, Del., a corporation of Delaware Application January 23, 1929. Serial No. 334,508

20 Claims. (Cl. 235—60)

One of the objects of this invention is to provide in a machine having separate subtotal and grand total keys, means whereby a subtotal may be automatically obtained, if desired.

Another object of the invention is to produce a machine which may be used to add and print items while the subtotal key is latched down.

Another object is to provide a construction which will permit of taking a grand total while the subtotal key is latched down.

Another object is to provide improved means for notifying the operator that the machine contains a credit balance or overdraft.

Another object is to provide means whereby when a credit balance is picked up the second time in the operation of proving the accuracy of the posting operation, such amount shall be properly entered in the counter.

A further object of the invention is to provide means for preventing a total from being taken in the event that the second pick-up of credit balance key is inadvertently left in depressed position.

In the accompanying drawings,

Figure 1 is a fragmental right-hand side elevation of a machine embodying the features of my invention, the machine being illustrated as containing a credit total or overdraft.

Fig. 2 is a fragmental horizontal sectional view illustrating certain parts associated with the total key.

Fig. 2A is a view of a latch to hold the subtotal key down.

Fig. 3 is a detail view of an arm included in the means for enabling the second pick-up of a credit total to be properly entered in the counter.

Fig. 4 is a detail view of certain parts shown in Fig. 1.

Fig. 4ᵃ is a fragmental horizontal sectional view of a certain carriage-controlled mechanism.

Figure 5:
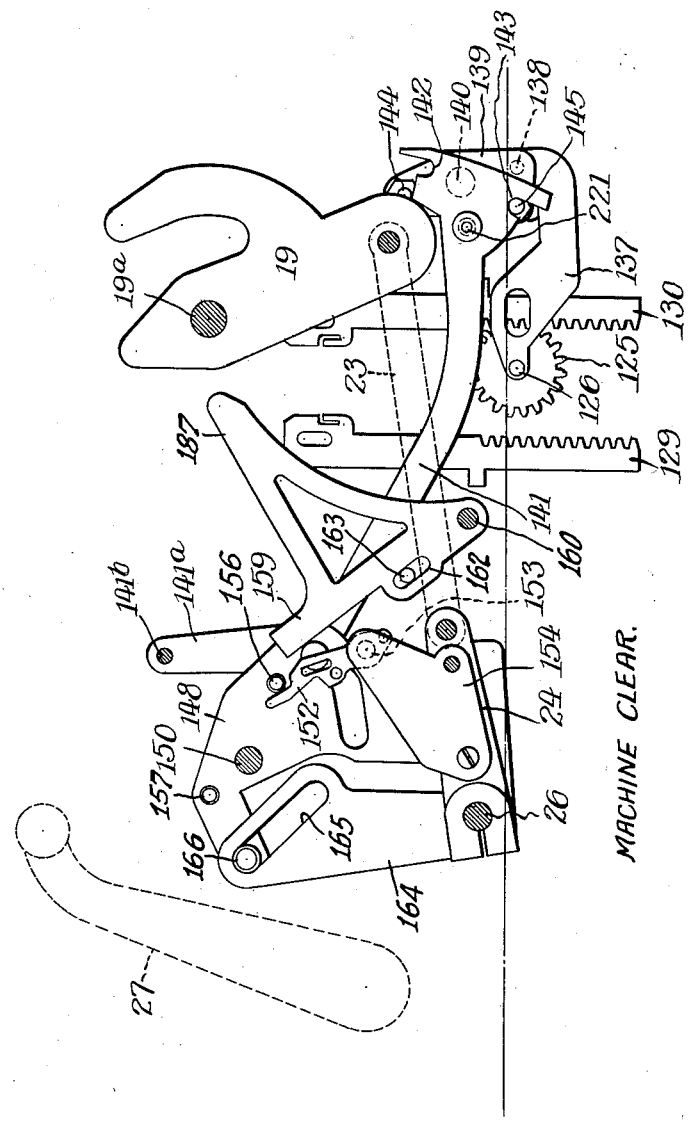

Fig. 5 is a view generally similar to Fig. 1, but showing the machine clear.

Fig. 6 is a view generally similar to that of Fig. 5 and showing the machine in the same position.

Fig. 7 is a view generally similar to Fig. 6, but showing the operation of taking a credit total, the operating handle being on its return stroke.

Figs. 8 and 9 are vertical sectional views of the totaling mechanism.

Fig. 10 is a fragmental side elevation of the parts immediately associated with the grand total, subtotal and subtraction keys, the parts being in normal position.

Fig. 10ᵃ is a detail view of the subtotal key and associated parts.

Fig. 11 is a fragmental side elevation showing the total key depressed.

Fig. 12 is a similar view showing the total and subtraction keys depressed.

Fig. 13 is a fragmental vertical sectional view illustrating the second pick-up of credit balance mechanism, with the key depressed.

Fig. 14 is a front view of the stops and the spacing-stroke-enforcing mechanism.

Fig. 15 is a fragmental plan section of the parts shown in Fig. 14.

Fig. 16 is a left-hand side view of the parts shown in Fig. 14.

Figure 17:
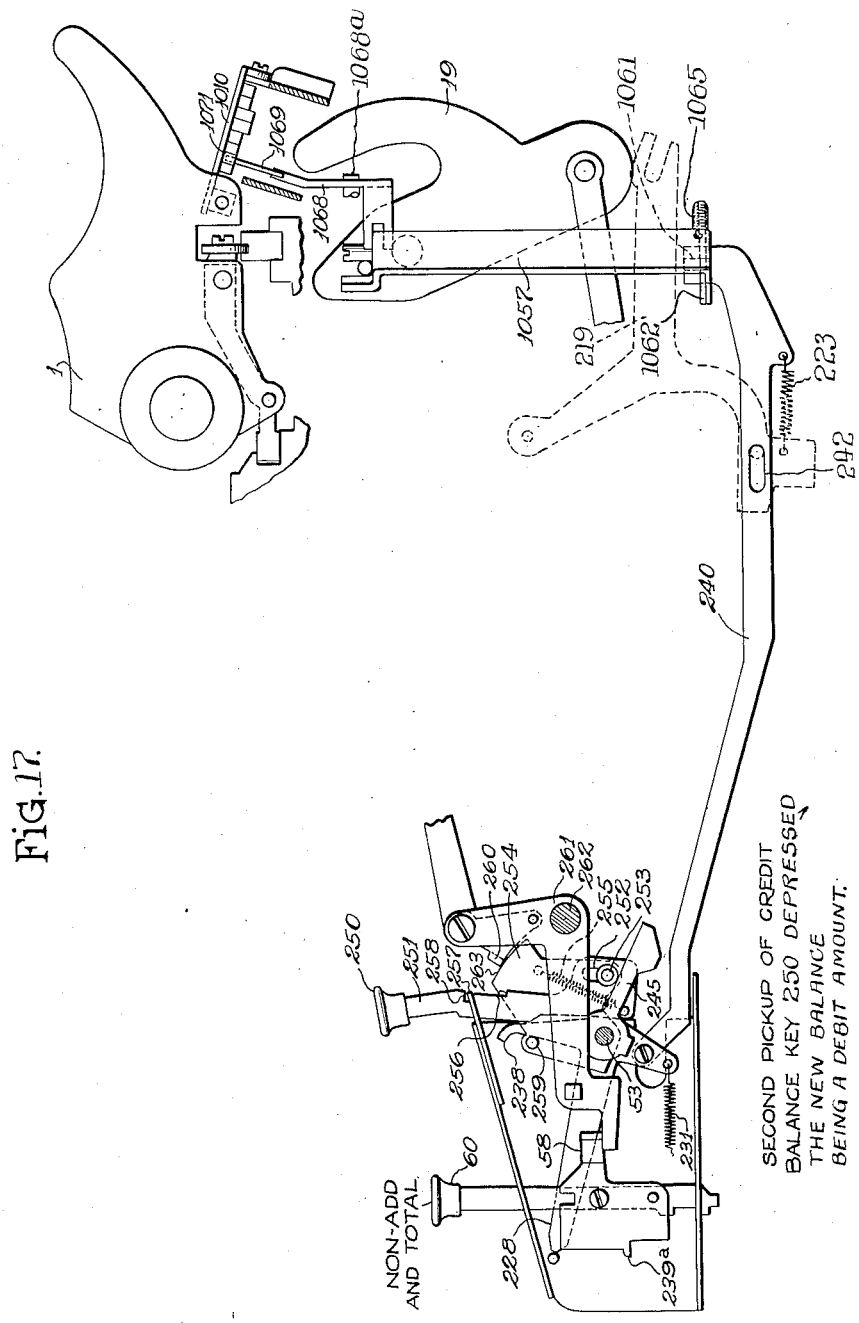

Fig. 17 is a fragmental right-hand side elevation of the machine.

The invention is herein shown as embodied in a machine of the general character disclosed in the Sunstrand Patent No. 1,198,487 and in my applications Serial Nos. 670,665 and 118,628, filed October 25, 1923, and June 26, 1926, respectively, but the invention is not limited to machines of that character. For features not fully disclosed herein, reference may be made to British Patent No. 223,866, which corresponds to said application Serial No. 670,665, and to French Patent No. 625,678, which corresponds to application Serial No. 118,628.

The ledger sheet or other work piece upon which items and totals are to be recorded may be supported in any preferred manner, as, for example, on a platen 2 mounted in a laterally movable carriage 1 (Fig. 17).

The printing mechanism comprises vertically reciprocatory type bars 3 which are actuated by means such, for example, as that disclosed in said patent and applications. Said means includes in the present instance, a lever 19 (Fig. 5) pivoted at 19ᵃ and a link 23 connecting said lever to a crank arm 24 on the main rock shaft 26. The shaft 26 is arranged to be rocked by a handle 27, although it will be understood that the machine may be driven by an electric motor, if desired.

The means for limiting the extent to which the type bars may rise and thus to determine which numerals shall be brought to the printing position, comprises stops 42 (Figs. 14 and 15) arranged to be moved into the path of pins 46 carried by arms 45 which are pivoted to the lower portions of the type bars. The pins 46 are guided for vertical movement in a slide 47 which is mounted on a stationary guide rod 48 extending transversely of the machine.

Means is provided to prevent those type bars which are not needed in printing a given item, from rising when the handle is pulled forward, and to prevent any of the type bars from rising during the blank stroke preceding the printing of a total. Said means comprises a detent plate 48ª (Figs. 1, 14, 15 and 16) guided to move in a horizontal plane longitudinally of the machine and close to the slide 47. In the printing or accumulation of an item, the rear edge of said plate is in the vertical plane of the pins 46 and thus prevents any pins 46 from rising except those which have been carried by the slide 47 to the right out from under the detent plate. Said plate is connected through a bar 48ᵇ to a rigid frame 48ᶜ. The frame 48ᶜ is mounted to swing on the axis 5. Contractile springs 48ᵈ tend to swing the frame 48ᶜ forward so as to withdraw the detent plate 48ª from the path of the pins 46, as shown in Fig. 15, but said frame is normally held in its rearward position whenever a digit is set up in the keyboard by means of the spacing-stroke-enforcing mechanism shown in Figs. 14, 15 and 16 herein and more fully described in my Patent No. 1,583,102. Said mechanism includes a plate 300 pivoted in the machine framework at 301 and arranged to swing toward and away from the reader, as viewed in Fig. 14. At the lower edge of the plate 300 is a lug 302. A lug 303 on the detent plate 48ª is continually held in contact with the lug 302 through the action of the springs 48ᵈ. Whenever a number key is depressed to set up the first digit of an item, the detent plate 48ª is pushed back into position to prevent the pins 46 from rising by means of a lever 304, one arm of which lever is arranged to be moved whenever a digit key is depressed, the other arm of said lever being adapted to move the lug 302 and thus move the detent plate 48ª rearwardly into position to prevent the printing of a total. The detent plate is held in this position against the force exerted by the springs 48ᵈ by means of a latch 306 pivoted in the machine framework and having a V-shaped tooth which is held in contact with the plate 300 by a contractile spring 307. When the lever 304 is operated, the plate 300 is forced rearwardly of the point of the tooth and is held there by the pressure of the latch.

In order that the detent plate 48ª shall be controllable by total keys when there is no digit set up in the keyboard, I provide a slide 49 (Fig. 1), the rear end of which is supported by a guide 50 fixed in the framework of the machine, and the forward end of which slide is pivoted at 51 to an arm 52 which is pivoted in the machine frame at 53. On the slide 49 is a projection 54 which lies in front of a pin 55 on the frame 48ᶜ. A spring 56 normally holds the slide 49 in its rearward position, said spring being more effective than the springs 48ᵈ. Rigid with the arm 52 is a forwardly extending arm 57 that underlies a projection 58 (Fig. 2) on the stem 59 of the grand total key 60. The arm 57 also underlies a pin 61 on the stem 62 of the subtotal key 63. It will be seen that by reason of the projection 54 and the pin 55 the type bars cannot be raised to print a total unless the subtotal key or the grand total key has been depressed.

Preferably means is provided to latch the subtotal keys 63 down, so that subtotals may be taken automatically, as in the Sundstrand patents hereinbefore mentioned. The form of latching means herein shown consists of a detent 64 (Fig. 2A) pivoted at 65 and adapted to enter a notch 66 in the stem of the subtotal key when the latter is depressed. 67 is a handle on the detent 64 for swinging it into and out of engagement with the key stem.

When in its rear operative position the slide 49 holds the detent plate 48ª in the position it occupies when addition, subtraction and the printing of added or subtracted items occur. The withdrawal of the slide 49 through the depression of the subtotal key 63, however does not interfere with the addition, subtraction and printing of items, and the subtotal key may be left latched, if automatic subtotals are desired, because the spacing-stroke-enforcing mechanism holds the detent plate 48ª in its rear or effective position so long as a digit is set up in the keyboard.

The calculating mechanism comprises a counter or series of pinions 125 rotatably mounted upon a transverse shaft 126. The shaft 126 is supported for sliding movement longitudinally of the machine. The set of pinions 125 (of which there is one for each type bar 3) is located between two sets of racks 129 and 130. Both of these sets of racks are connected to the bars 3, and the counter is arranged to be moved into mesh with either set of racks.

Addition is accomplished by means of the set of racks 130. When an amount is to be added, the pinions are moved forward into neutral position between the two sets of racks before the type bars are raised, and are moved rearwardly into mesh with the racks 130 just before the type bars are moved downwardly. Addition therefore occurs in the down stroke of the racks 130.

Subtraction is effected by rotating the pinions in the reverse direction by means of the racks 129, subtraction occurring in the down stroke of said racks.

The upper end of each rack is attached to a rearwardly extending portion 131 of one of the type bars by means permitting relative movement between the racks and the type bar for transfer purposes, as fully explained in my application Serial No. 670,665.

The counter is moved into and out of mesh with the racks by means such for example, as that disclosed in my application Serial No. 670,665, said means comprising two links 137 (Fig. 5) one at each side of the machine, the forward ends of which links have bearings to receive the ends of the shaft 126. The rear ends of the links 137 are pivoted at 138 to the lower arms of two levers 139, one at each side of the machine, said levers being rigidly secured to a shaft 140 journaled in the machine frame.

The means for swinging the levers 139 to move the counter into and out of mesh with the racks comprises a link 141, the forward end of which is supported by a lever 141ª pivoted in the machine frame at 141ᵇ. The rear end of the link 141 is provided with notches 142 and 143 to receive pins 144 and 145, respectively, on opposite ends of the right-hand lever 139. The link 141 is moved forward and back by means of an oscillatory cam plate 148 which is pivoted at 150. The means for oscillating the cam 148 comprises a reversible pawl 152 which is pivoted at 153 upon a plate 154 fixed to the crank arm 24. One side of the pawl is adapted to engage a pin 156 set in the cam plate 148 at one side of its axis 150, the other side of the pawl being adapted to engage a pin 157 fixed in the cam 148 at the opposite side of its axis.

When a number is to be added or subtracted the pawl 152 is permitted to engage the pins 156 and 157 so as to swing the cam 148 to effect movement of the pinions out of mesh with the racks before the latter rise and into mesh with the racks before they descend.

When a total (whether subtotal or grand total) is to be printed, the pawl 152 is not permitted to engage the pin 156; consequently, the cam 148 is not moved during the forward stroke of the handle 27, and the pinions remain in mesh with the racks during the rising of the latter, thereby effecting the positioning of the type bars for the printing of the total.

The means for controlling engagement of the pawl 152 with the pin 156 comprises an arm 159 (Fig. 6) pivoted at 160 in the machine frame, the upper end of said arm having an angular lug 161 adapted to hold the pawl 152 out of position to engage said pin. In the arm 159 is an elongated opening 162 in which lies a pin 163 fixed to the swinging frame 48$^c$. The arm 159 is therefore under the control of the spacing-stroke-enforcing mechanism. During the spacing cycle, the plate 300 is moved forwardly away from the detent plate 48$^a$, as described on page 5, lines 50 et seq., of my Patent No. 1,583,102. When the grand total key or the subtotal key is depressed, the springs 48$^d$ move the detent plate 48$^a$ out of the path of the pins 46 and also swing the arm 159 forward to hold the pawl 152 out of engagement with the pin 156; therefore the cam 148 is not moved during the forward stroke of the handle 27, in the total-taking cycle, and the counter remains in mesh with the racks during the rise of the latter, thereby effecting the positioning of the type bars for the printing of a total.

When the counter is to be cleared, the pinions are withdrawn from the racks before the latter descend. The means for swinging the cam 148 to effect such movement comprises a lever 164 pivoted on the shaft 26 and having a cam slot 165 in which lies a roller 166 on the cam 148. The lever 164 has an arm 167 which is arranged to be engaged by a pin 168 on the arm 24. The means for swinging the lever 164 forward to disengage the pinions from the racks is controlled by the grand total key 60. On the stem 59 is a stud 171 that underlies the forward end of a lever 172. The lever 172 has an elongated opening 173 through which a pivot rod 174 extends, the lever 172 thus being movable longitudinally to a slight extent. A contractile spring 175 tends to slide the lever 172 rearwardly. 176 is a contractile spring stretched between a pin 176$^a$ on the stem 59 and the front end of the lever 172, said spring tending to hold the pin 171 and the lever 172 in contact with each other. During the printing of an item and during the enforced blank or spacing stroke prior to the taking of a total, the lever 172 is held against movement by the spring 176 by means comprising a cam plate 177 which is pivoted at 178 and is acted upon by a contractile spring 179. On the rear end of the lever 172 is a pin 180 underlying the cam plate 177. The edge 177$^a$ of the cam plate 177 is arranged to be engaged by a stud 37 carried by the adjacent lever 19 (see Fig. 7).

During the printing of an item, and during the spacing stroke preceding the printing of a total, the movement of the cam plate 177 under the influence of the spring 179 is restrained by a detent arm 181 pivoted at 182 in the framework of the machine. A contractile spring 183 normally holds the lower edge 181$^a$ of the arm 181 in contact with the stud 37. On the detent arm 181 is a pin 184 adapted to engage a hook 185 on the cam plate 177. When the handle is pulled to print an item or take a blank spacing stroke, the movement of the stud 37 out from under the edge 181$^a$ allows the spring 183 to swing the detent arm 181 down so as to place the pin 184 in the path of the hook 185. When the handle is pulled to print a total, the detent arm 181 is prevented from moving under the influence of the spring 183 into position where the pin 184 is in front of the hook 185, by means of a pin 186 on an arm 187 which is rigid with the arm 159. When the arm 159 is in its forward position the pin 186 lies under the front end of the detent arm 181 and holds it elevated. The upper end of the arm 181 is cut away so as to clear the pin 186 when the arm 159 is in its rearward position (as it is when an item has been set up or an enforced blank stroke is to be taken). When a subtotal is being taken, the pin 184 does not interfere with the movement of the plate 177 under the tension of the spring 179, but said plate swings only until the portion 177$^b$ thereof strikes the pin 180. The pin 171 on the grand total key stem prevents the lever 172 from tilting.

A detent plate 188 pivoted on the center 178 has a cam slot 189 having a dwell portion 190 in which the stud 37 is arranged to run. That portion of the pin 180 which projects from the inner side of the lever 172 underlies the plate 188. In the lower edge of the plate 188 is a notch 191.

After a blank stroke has been taken, depression of the grand total key 60 allows the swinging frame 48$^c$ (and consequently the arm 187) to move into their forward position, and therefore the cam plate 177 is free to swing counterclockwise as the stud 37 moves forward, away from the edge 177$^a$, in the forward stroke of the handle 27 until the pin 180 on the rear end of the lever 172 has risen under the influence of the spring 176 until said pin 180 is in a locking notch 192 in the cam plate 177. The pin 180 does not enter said notch 192 until the movement of the plate 188 under the action of the stud 37 has brought the notch 191 into register with said pin 180, whereupon the spring 176 causes the pin 180 to enter the notches 191 and 192. Very shortly after the handle 27 has commenced its return stroke, the stud 37 acting on the walls of the cam slot 189 swings the plate 188 downwardly, thus pushing the pin 180 and the lever 172 forwardly. On the lever 172 is a shoulder 193 (Fig. 7) which moves up into place directly behind a pin 194 on the lever 164 when the lever 172 is tilted by the spring 176. When the lever 172 is pushed forward by the plate 188, the shoulder 193 pushes the lever 164 forward, thereby swinging the cam 148 upwardly (as shown in Fig. 7) and thus causing the pinions to move out of mesh with the racks. As before indicated, this occurs during the early part of the return movement of the handle 27 and before the racks descend, the pinions being therefore left standing at zero. As the stud 37 continues on its return stroke, it strikes the edge 177$^a$ and swings the plate 177 against the tension of the spring 179, the lower edge of said plate positively camming the pin 180 down and thus in conjunction with the spring 175 restoring the lever 172 to its initial or inoperative position. As the arm 24 returns to its initial position, the pin 168 thereon engages the arm 167 and restores the lever 164 to its initial position.

It will be seen that the means (172, etc.) for controlling the counter during the taking of a grand total is independent of the means (49 etc.) for controlling the counter during the taking of a subtotal. A grand total may therefore be taken while the subtotal key 63 is latched down.

It is sometimes desirable to print an item without introducing it into the counter. The means herein shown for this purpose is identical with that fully disclosed in my application Serial No. 670,665 except that it is controlled by the grand total key 60 instead of by a separate non-add key. The non-add means acts to prevent the pawl 152 from engaging the pin 157 so that the counter shall not be moved into mesh with the racks at the beginning of the down stroke. A slide 195 (Fig. 8) is mounted on two guide studs 196 for movement longitudinally of the machine. On the slide 195 is a cam surface 197. A contractile spring 198 tends to draw the slide 195 rearwardly to bring the cam surface 197 into such position that when the pawl 152 is carried forward a pin 199 on said pawl shall engage the surface 197, thus holding the pawl down so that on its return stroke it is unable to engage the pin 157. The slide 195 is normally locked in its forward position by a projection 200 on a bell crank 201 pivoted on the axis 174. A contractile spring 202 normally holds the bell crank in such position that the lug 200 lies behind a shoulder 203 on the slide 195. The projection 58 on the stem of the grand total key 60 overlies the forward end of the bell crank 201. It will be seen that when the grand total key is depressed the lug 200 is withdrawn from behind the shoulder 203. The rearward movement of the slide 195 under the action of the spring 198 is controlled by the oscillating arm 204 that actuates the ribbon feed mechanism, the lower end of the arm lying behind the rear end of the slide. In the return stroke of the handle 27 the arm 204 restores the slide 195 to its normal forward position.

Referring now to the means for controlling the machine during credit operations: When the machine is clear the link 141 (Fig. 5) is in engagement with the pin 145, the pinions being then in mesh with the racks 130. Reciprocation of the link 141 will therefore shift the pinions into and out of mesh with those racks. When an amount is to be subtracted the link 141 is shifted into engagement with the pin 144. The means for shifting the link 141 comprises a lever 219 (Fig. 1) pivoted at 220 in the machine frame and having a forked rear end which engages a pin 221 on the link 141. The lever 219 has a downwardly extending arm 222 to which is attached a contractile spring 223 that serves to raise the lever 219 and hence the link 141. The spring 223 is controlled by means including a subtraction key 224 having a stem 225 which is guided for vertical movement. A contractile spring 226 normally holds the subtraction key elevated. On the stem 225 is a pin 227 that overlies a forwardly extending arm 228 pivoted at 53. Rigid with the arm 228 is a downwardly extending arm 230. A contractile spring 231 connected to the arm 230 tends to draw said arm forward. When the subtraction key is depressed the arm 230 is locked against actuation by the spring 231 by means of a finger 232 fixed to one end of a rock shaft 233 and adapted to overlie the arm 228. By means such as that described in my application Serial No. 670,665, the finger 232 is disengaged from the arm 228 in the return stroke of the handle. The finger 232 also serves to lock the subtraction key down, there being a hook 238 (Figs. 4 and 12) rigid with the arms 228 and 230 which is adapted to engage a pin 239 on the stem 225. The finger 232 also locks the grand total key 60 down, said finger being adapted to engage a lug 239$^a$ on the stem of said key. The finger 232 also locks the subtotal key down. Reference may be made to Fig. 10$^a$ where it will be seen that an arm 239$^b$ pivoted on the axis 53 is connected to the key stem 62 by means of a pin 239$^c$ and a slot 239$^d$. The forward end of the arm 239$^b$ is arranged to be held down by the finger 232.

To the lower end of the arm 230 is pivoted a link 240 which has a lost-motion connection with the arm 222 consisting of a headed stud 241 on the arm 222 extending through an elongated opening 242 in the link 240. The contractile spring 223 is anchored to the link 240.

When the machine is clear and also when there is a debit balance in the machine, the link 141 is in engagement with the pin 145. If an item is to be subtracted, the subtraction key 224 is depressed, thereby pushing the link 240 rearwardly and thus moving the rear end wall of the opening 242 away from the stud 241. When the handle is pulled the link 141 is drawn forward, as before explained, to withdraw the pinions from the racks 130 before the latter rise. The forward movement of the link 141 causes the levers 139 to rock, as a result of which the pin 144 is brought into register with the notch 142. Thereupon the spring 223 draws the arm 222 rearwardly, thus placing the notch 142 in engagement with the pin 144. In the return stroke of the handle the link 141 is pushed rearwardly, thereby rocking the levers 139 in the direction to place the pinions in mesh with the racks 129 before the latter start down, whereby the pinions are rotated in the reverse direction to subtract the item.

Automatic mechanism, as, for example, that fully described in my application Serial No. 118,628, is provided to introduce a unit into the totalizer whenever the latter has "passed through zero" in order to obtain the correct total.

When there is a credit total, that is to say, an overdraft, in the counter, it is desirable to give the operator warning of that fact. This is accomplished by locking the grand total key and the subtotal key so that the operator cannot take a subtotal or a grand total. As explained in application Serial No. 118,628, the counter is in mesh with the subtracting racks 129 when it contains a credit total. The link 141 (Fig. 5) is then in engagement with the pin 144, and the spring 231 (Fig. 1) holds the link 240 as far forward as the stud 241 will permit. The arm 228 is then in the position shown in Fig. 1. Rigid with the arm 228 is an arm 245 (Fig. 4) which, when the arm 228 is in the position just described, lies directly in the path of a stop 246 on the slide 49. It will be seen that when the arm 245 is in the position shown in Fig. 1 the slide 49 cannot be moved forward and hence the grand total key 60 and subtotal key 63 cannot be depressed. The operator is thus notified that the machine contains an overdraft. The total keys may be unlocked by depressing the subtraction key 224, the pin 227 on the stem of said key depressing the arm 228 and thus raising the arm 245 above the path of the stop 246, as in Fig. 12.

The stop 246 is mounted on the slide 49 to yield upwardly, the stop being pivoted at 247 and being normally held against a stop pin 248 by a spring 249. By reference to Fig. 11 it will be seen that if one of the total keys were depressed, and the subtraction key were subsequently depressed, the stop 246 would yield upwardly to allow the arm 245 to pass.

As shown in Fig. 12, the rear end of the arm 245 is of such dimensions that it lies directly above the stop 246. When in this position the stop prevents movement of the link 240 under the tension of the spring 231. With the parts in the position shown in Fig. 12, if the operator were to give the handle 27 a short pull and release it, the finger 232 would be actuated to release the total key 60 and the subtraction key 224, but said keys would still be held down and the link 240 held in its rear or subtracting position by engagement of the arm 245 with the stop 246. If the link 240 were not thus held, such short movement of the handle might cause improper engagement of the link 141 with the studs 144 and 145, as the link 141 might not rise far enough to engage the upper stud 144 properly and be fully disengaged from the lower stud 145.

In order to prove the correctness of machine posting it is customary, after entering the debits or credits, to "pick up" (that is to say, set up on the keyboard) the old balance again and then operate the machine to subtract the old balance from the new balance. If the old balance was set up correctly in both instances (being added the first time and subtracted the second time) the remainder will be the same as the total of the debits or credits posted, thus proving the accuracy of the picking up of the old balance. Since the balance of the customer's account will ordinarily be a debit, it is customary to arrange the carriage-actuated controls on the machine so that when the second pick-up of the old balance is registered in the machine it will be subtracted as just explained.

If, however, the old balance is an overdraft, it is subtracted when picked up the first time, and consequently it is necessary to add the old balance when it is picked up the second time, in order to prove the accuracy of the posting; and inasmuch as the machine is normally arranged to subtract the second pick-up, it is necessary to provide means whereby, when the old balance was an overdraft, the second pick-up will be added. Such means will now be described.

One form of carriage-controlled means for causing the machine to subtract is disclosed in my application Serial No. 118,626, reference being made to Figs. 1, 7 and 21 of that application, and to Fig. 17 of the present application. Said means serves to move the link 240 rearwardly as though the subtraction key 224 had been depressed. I have herein shown a portion of said means, namely, a member 1057 (Fig. 4a) in the nature of a lever pivoted at 1059 in the machine frame. The inner arm 1060 of said lever is adapted to engage a lug 1061 on the link 240 for the purpose of drawing said link rearwardly. The end of the arm 1060 is made capable of yielding, said arm comprising a section 1062 which is pivoted at 1063, a stop lug 1064 on said section being normally held against the edge of the arm 1060 by a contractile spring 1065.

When the carriage 1 reaches the columnar position in which the old balance is to be picked up the second time, means is operated to effect conditioning of the machine to subtract the old balance. For this purpose, the lever 1057 is mounted for upward adjustment to bring the section 1062 into the horizontal plane of the lug 1061 on the subtraction link 1040. The lever 1057 is thus lifted by means of a bell crank 1068 pivoted at 1068a in the machine frame. One arm of said bell crank is forked to engage the lever 1057, and the other arm is connected to a slide 1069 supported in the machine frame.

A plate 1010 is attached to the carriage 1. On the lower side of this plate is a stop pin 1071 located to correspond with the columnar position wherein the old balance is to be picked up the second time. As the carriage comes to rest in this position, the stop pin 1071 engages the slide 1069 and moves it toward the left of the operator (away from the reader in Fig. 17), thereby lifting the lever 1057 into position to engage the lug 1061. In the ensuing cycle of operations, the counter is normally automatically conditioned for a subtraction operation.

When a credit balance or overdraft is to be picked up the second time, the link 240 must be drawn forward, notwithstanding the action of the lever 1057. This I accomplish by means including a key 250 (Fig. 13) carried by a stem 251 which is guided for approximately vertical movement. The lower portion of the stem 251 has a vertically elongated opening 252 through which extends a headed stud 253 on an arm 254 (Fig. 3). Said arm is pivoted on the axis 53. A spring 255 stretched between points on the stem 251 and the arm 254 normally holds the stem elevated and also holds the arm 254 in the position shown in Fig. 1, the normal position of the parts 251 and 254 being determined by engagement of a shoulder 256 on the stem 251 with a stationary part 257. In the stem 251 is a locking notch 258. On the arm 254 is a pin 259 in front of the arm 238.

If, when a credit balance is to be picked up the second time, the new balance is still a credit balance, the link 240 is in the position shown in Fig. 1 and the surface of the link 141 (Fig. 5) directly forward of the notch 143 is resting upon the stud 145. Consequently, the link 141 cannot move down, the arm 219 cannot swing down, the link 240 cannot move farther forward and the part 254 cannot swing rearwardly. The yielding connection between the stem 251 and the arm 254 permits the key 250 to be completely depressed, even though the rearward movement of the arm 254 is limited by engagement of the pin 259 with the arm 238. After the link 141 has been shifted in the ensuing cycle of operations of the machine, the spring 255 (Fig. 13) and the spring 231 cause the link 240 to be drawn into its forward position and the counter to be shifted into position for addition, in spite of the effort of the lever 1057 to move the link 240 rearwardly into subtracting position. The springs 255 and 231 are more effective than the spring 1065, hence the latter yields as the lever 1057 swings clockwise as viewed in Fig. 4a.

If, when a credit balance is to be picked up the second time, the new balance is a debit, the counter is in mesh with the adding racks, as in Fig. 5, the link 141 is in its adding or lower position, as in Fig. 5, the lever 219 also is in its lower position, as in Fig. 17, and the link 240 is in the forward or addition position shown in Fig. 17. Depression of the key 250 causes the arm 254 to swing rearwardly until the pin 259 lies against the arm 238, whereby the link 240 is held in its forward or addition position. Consequently, when the carriage-controlled mechanism of which the lever 1057 is a part endeavors to draw the link 240 rearwardly into subtracting position, the machine remains in condition to add, the spring 1065 yielding as the lever 1057 is moved.

After the credit balance has been picked up the second time and the machine actuated to add such amount, the second pick-up of credit balance key 250 should be unlatched by moving said key rearwardly to disengage the notch 239 from the part 257, thereby allowing the spring 255 to restore the key 250 and the arm 254 to their normal elevated positions. If the key 250 were inadvertently left in depressed condition, one or more items might be added which should have been subtracted. I therefore provide means for preventing a total from being taken while the key 250 is down. Said means comprises a lug 260 (Fig. 13) secured to a lever 261 which is pivoted on the axis 262. Said lever comprises a forwardly extending arm that underlies the lug 58 on the stem of the non-add and total key 60. The arm 254 comprises a surface 263 which is curved on the arc of a circle struck from the center 53. As shown in Fig. 13, when the second pick-up of credit balance key 250 is in its depressed position, the surface 263 lies directly in front of and close to the lug 260 and thereby prevents the total key 60 from being depressed.

I claim as my invention:

1. The combination of a counter, racks for rotating the counter in accumulating and total-taking operations, means including a cam for controlling engagement of the counter with said racks in such operations, a reversible pawl for oscillating said cam in accumulating operations, a part which occupies a certain position in accumulating operations and another position in total-taking operations, said part tending to move into total-taking position, means actuated by said part for disabling said pawl when a subtotal is to be taken, a member normally holding said part in accumulating position, a subtotal key for rendering said member ineffective, means for oscillating said cam for the taking of a grand total, and means including a grand total key for controlling said last-mentioned cam-oscillating means.

2. The combination of a counter, racks for rotating the counter in accumulating and total-taking operations, means including a cam for controlling engagement of the counter with said racks in such operations, means for oscillating said cam in accumulating operations, a part which occupies a certain position in accumulating operations and another position in total-taking operations, means actuated by said part for disabling said cam-oscillating means when a subtotal is to be taken, a member normally holding said part in accumulating position, a subtotal key for rendering said member ineffective, means for oscillating said cam for the taking of a grand total, and means including a grand total key for controlling the last-mentioned cam-oscillating means.

3. The combination of a counter, racks for rotating the counter in accumulating and total-taking operations, means including a cam for controlling engagement of the counter with said racks in such operations, a reversible pawl for oscillating said cam in accumulating operations, a swinging frame which occupies a certain position in accumulating operations and another position in total-taking operations, a spring tending to move said frame into total-taking position, means actuated by said frame for disabling said pawl when a subtotal is to be taken, a slide normally holding said frame in accumulating position, and a subtotal key for rendering said slide ineffective.

4. The combination of a counter, means for rotating the counter including a plurality of reciprocatory bars, a detent plate movable into and out of position to prevent movement of said bars, a swinging frame connected to said detent plate, spring means tending to place the detent plate out of position to prevent movement of said bars, a member engaging said swinging frame, a spring acting on said member and normally effective to overcome the first-mentioned spring means, a grand total key and a subtotal key arranged to move said member in opposition to its spring, and means for operating said bars and said counter to take a total.

5. The combination of a counter, means for rotating the counter including a plurality of reciprocatory bars, a detent movable into and out of position to prevent movement of said bars, a swinging frame connected to said detent, spring means tending to place the detent out of position to prevent movement of said bars, a slide engaging said swinging frame, a spring acting on said slide and normally effective to overcome the first-mentioned spring means, a grand total key arranged to move said slide in opposition to its spring, and means for operating said bars and said counter to take a grand total.

6. The combination of a counter, means for rotating the counter including a plurality of reciprocatory bars, a detent movable into and out of position to prevent movement of said bars, a swinging frame connected to said detent, spring means tending to place the detent out of position to prevent movement of said bars, a slide engaging said swinging frame, a spring acting on said slide and normally effective to overcome the first-mentioned spring means, a subtotal key arranged to move said slide in opposition to its spring, and means for operating said bars and said counter to take a subtotal.

7. The combination of a counter, means for rotating the counter including a plurality of reciprocatory bars, a subtotal key, means for latching the key in operative position, and means whereby items may be registered in the counter while the subtotal key is thus latched, said last-mentioned means including a detent movable into and out of a position wherein it prevents movement of said bars, means tending to move the detent out of such position, and means normally overcoming such tendency, the subtotal key being arranged to disable the last-mentioned means.

8. A computing machine having subtotal-taking means including a subtotal key, means to latch said key in operative position, and grand total-taking means operable while the subtotal key is thus latched.

9. A computing machine comprising a counter operable in one direction for addition and in the opposite direction for subtraction, racks for thus operating the counter, a detent movable into and out of position to prevent movement of the racks, spring means tending to place the detent out of such position, a spring-actuated member normally effective to overcome such tendency, a total key arranged to withdraw said member, a stop on said member, said stop being yieldable in one direction, and a pivoted arm arranged to lie in the path of said stop when the counter contains an overdraft.

10. A computing machine comprising a counter operable in one direction for addition and in the opposite direction for subtraction, racks for thus operating the counter, a detent movable into and out of position to prevent movement of said racks, spring means tending to place the detent out of such position, a spring actuated member normally effective to overcome such tendency, a grand total key and a subtotal key arranged to withdraw said member, and means to prevent withdrawal of said member when the counter contains an overdraft.

11. In a computing machine, a counter, means for controlling said counter in adding and subtracting operations, a subtotal key, a grand total key, a member movable in the operation of either key, a stop on said member, said stop being yieldable in one direction, and a pivoted arm connected to said counter-controlling means and arranged to lie in the path of said stop when the counter contains an overdraft.

12. In a computing machine, a counter, means for controlling said counter in adding and subtracting operations, said means including a subtraction key, a total key, a member movable in the operation of said total key, a stop on said member, and a pivoted arm connected to said counter-controlling means and arranged to lie in the path of said stop when the counter contains a credit total, said counter-controlling means including a spring tending to adjust the counter for credit operations, said subtraction key being arranged to remove said arm from the path of said stop, said stop being arranged to support said arm against the tension of said spring.

13. A computing machine comprising a reversible counter, means for controlling the counter in adding and subtracting operations, automatically-operable means to cause the counter to perform one of said classes of operations, a pivoted arm arranged to swing as the counter-controlling means operates, an arm pivoted on the same axis as the first arm, the second arm being arranged to engage and move the first arm and thus render the automatically-operable means ineffective, a key yieldingly connected to the second arm for swinging the latter, and means for latching the key in operated position.

14. A bookkeeping machine comprising a reversible counter, means for controlling said counter in adding and subtracting operations, automatically-operable means to cause the counter to subtract, and means including a key to render said automatically-operable means ineffective, said automatically-operable means including a longitudinally movable link, and said key being arranged to prevent effective movement of said link.

15. A bookkeeping machine comprising printing means including a laterally movable platen, a counter, means for controlling said counter in adding and subtracting operations, automatically-operable means to cause the counter to subtract when the platen is in a certain position, and means including a key to render said automatically-operable means ineffective, said automatically-operable means including a longitudinally movable link, and said key being arranged to prevent effective movement of said link.

16. A bookkeeping machine comprising printing means including a laterally movable platen, a counter, means for controlling the counter in adding and subtracting operations, automatically-operable means to cause the counter to subtract when the platen is in a certain position, a part moving with said controlling means, a member to engage and move said part and thus render said automatically-operable means ineffective, and a key yieldingly connected to said member for moving the latter.

17. A computing machine comprising a reversible counter, means for controlling the counter in adding and subtracting operations, automatically-operable means to cause the counter to perform one of said classes of operations, manual means to render said automatically operable means ineffective, total-taking means, and means to prevent operation of the total-taking means when said manual means is in operated position.

18. A bookkeeping machine comprising printing means including a laterally movable platen, a counter, manually-controlled means to cause addition in the counter when the platen is in a certain position, total-taking means, and means to prevent operation of the total-taking means when said manually-controlled means is in effective condition.

19. A bookkeeping machine comprising printing means including a laterally movable platen, a counter, means for controlling the counter in adding and subtracting operations, automatically-operable means to cause the counter to subtract when the platen is in a certain position, manual means to render said automatically-operable means ineffective, total-taking means, and means to prevent operation of the total-taking means when said manual means is in operated position.

20. A computing machine having, in combination, a counter, means for taking a total, means for controlling the counter during the taking of a subtotal, said controlling means including a subtotal key, means for latching the subtotal key in operated position, and means (independent of the first-mentioned controlling means) for controlling the counter during the taking of a final total, whereby a final total may be taken while the subtotal key is latched.

OSCAR J. SUNDSTRAND.